(12) United States Patent
Wang et al.

(10) Patent No.: US 12,461,511 B2
(45) Date of Patent: Nov. 4, 2025

(54) DEVELOPMENT OF A PRODUCT USING A PROCESS CONTROL PLAN DIGITAL TWIN

(71) Applicant: The Boeing Company, Chicago, IL (US)

(72) Inventors: Guijun Wang, Bellevue, WA (US); Joseph R. Dvorak, Everett, WA (US); Lu Yue, Bellevue, WA (US); Jeff Miller, Everett, WA (US); Edward Li, Everett, WA (US); Raluca M. Dumitrache, Everett, WA (US); Christopher Matsuoka, Tukwila, WA (US); Priya Sukumaran, Bangalore (IN); Michael J. Christian, Berkeley, MO (US); Tripti Mandal, Bangalore (IN)

(73) Assignee: The Boeing Company, Arlington, VA (US)

( * ) Notice: Subject to any disclaimer, the term of this patent is extended or adjusted under 35 U.S.C. 154(b) by 596 days.

(21) Appl. No.: 17/658,386

(22) Filed: Apr. 7, 2022

(65) Prior Publication Data
US 2022/0365518 A1 Nov. 17, 2022

(30) Foreign Application Priority Data
May 14, 2021 (IN) .............................. 202111021830

(51) Int. Cl.
G05B 19/418 (2006.01)
G06F 30/15 (2020.01)
G06Q 50/04 (2012.01)

(52) U.S. Cl.
CPC ... *G05B 19/41865* (2013.01); *G05B 19/4183* (2013.01); *G05B 19/41885* (2013.01); *G06F 30/15* (2020.01); *G06Q 50/04* (2013.01)

(58) Field of Classification Search
CPC .......... G05B 19/41865; G05B 19/4183; G05B 19/41885; G05B 17/02; G05B 19/41875;
(Continued)

(56) References Cited

U.S. PATENT DOCUMENTS

| 6,035,305 A | 3/2000 | Stevey et al. |
| 6,681,145 B1 | 1/2004 | Greenwood et al. |

(Continued)

FOREIGN PATENT DOCUMENTS

EP 3968110 A1 3/2022

OTHER PUBLICATIONS

Reid, J. & Rhodes, D. Digital System Models: An investigation of the non-technical challenges and research needs. 2016 Conference on Systems Engineering Research, Systems Engineering Advancement Research Initiative, Massachusetts Institute of Technology, Cambridge, MA, 02139. 10 pages.

(Continued)

*Primary Examiner* — Rami R Okasha
(74) *Attorney, Agent, or Firm* — Alleman Hall & Tuttle LLP (57) ABSTRACT

A method of developing a product is provided that includes generating a digital system model (DSM) that describes the product and a manufacturing process for the product, and generating a digital twin (DTw) of an instance of a component of the manufacturing process, the DTw including a digital replica of the instance. The method includes receiving attribute data for attributes of process/process characteristics subject to sources of variation that affect product quality. The digital replica is executed with input of the attribute data, and thereby updating the DTw to replicate the instance of the component of the manufacturing process as performed. A data analysis of the manufacturing process is performed based on the DTw as updated, and the manufac- (Continued)

turing process is modified based on the data analysis to reduce variability in one or more product characteristics. The DTws of multiple instances may be used to generate further improvement.

22 Claims, 6 Drawing Sheets

(58) Field of Classification Search
CPC .......... G05B 2219/32385; G05B 2219/35031; G05B 2219/35081; G06F 30/15; G06F 8/30; G06Q 50/04
See application file for complete search history.

(56) References Cited

U.S. PATENT DOCUMENTS

| | | | |
|---|---|---|---|
| 8,239,362 | B1 | 8/2012 | Frazier |
| 8,880,381 | B2 | 11/2014 | Mattikalli et al. |
| 8,983,881 | B2 | 3/2015 | Fox et al. |
| 10,204,323 | B1 | 2/2019 | Miller et al. |
| 11,631,060 | B2 * | 4/2023 | Davis ................ B33Y 50/02 705/305 |
| 2009/0138874 | A1 | 5/2009 | Beck et al. |
| 2018/0137219 | A1 * | 5/2018 | Goldfarb ............... G06N 3/126 |
| 2018/0196409 | A1 * | 7/2018 | Ben-Bassat ........... G06Q 10/06 |
| 2018/0362190 | A1 * | 12/2018 | Chambers ............... B64F 5/60 |
| 2019/0304673 | A1 * | 10/2019 | Neti ..................... H01F 27/42 |
| 2020/0265329 | A1 * | 8/2020 | Thomsen .............. G06N 20/10 |
| 2020/0334402 | A1 | 10/2020 | Grefen |
| 2020/0394351 | A1 * | 12/2020 | Roemerman ........... G06F 30/27 |
| 2022/0067233 | A1 * | 3/2022 | Blackwell ............... A63F 13/65 |
| 2022/0083926 | A1 * | 3/2022 | Miller ............ G06Q 10/06395 |
| 2022/0100851 | A1 * | 3/2022 | Mehrotra ................. G06F 8/65 |
| 2022/0229424 | A1 * | 7/2022 | Linder ............. G05B 19/41885 |
| 2022/0277119 | A1 * | 9/2022 | Brucksch ............... G06F 30/27 |

OTHER PUBLICATIONS

Magni, A. et al. Leveraging Digital Twin Technology in Model-Based Systems Engineering. Intelligent Systems Technology, Inc., Los Angeles, CA, and Research and Engineering, Washington, DC, published Jan. 30, 2019, 13 pages. <DOI: 10.3390/systems7010007>.
Aerospace Series—Requirements for Advanced Product Quality Planning and Production Part Approval Process. AS9145, Aerospace Standard, SAE International. Issued Nov. 2016. 29 pages.
Canadian Intellectual Property Office, Office Action and Search Report Issued in Application No. 3,155,163, Feb. 8, 2024, 7 pages.
Extended European Search Report in the corresponding European patent application No. 22167923, mailed Sep. 30, 2022. 2 pages.
Digital Twin: Definition & Value. An AIAA and AIA Position Paper, authored by the AIAA Digital Engineering Integration Committee, AIAA and Aerospace Industries Association (AIA), pp. 1-16, Dec. 1, 2020. 16 pages. Retrieved from the Internet <URL: https://www.aiaa.org/docs/default-source/uploadedfiles/issues-and-advocacy/policy-papers/digital-twin-institute-position-paper-(december-2020).pdf>.
Wagner, R. et al. Digital DNA in quality control cycles of high-precision products. CIRP Annals, Elsevier BV, vol. 69, No. 1, pp. 373-376, Jan. 1, 2020. 4 pages. <DOI: 10.1015/j.cirp.2020.03.020>.
European Patent Office, Office Action Issued in Application No. 22167923.6, Jan. 31, 2025, Netherlands, 10 pages.
Canadian Intellectual Property Office, Office Action Issued in Application No. 3,155,163, May 23, 2025, 7 pages.

* cited by examiner

DEVELOPMENT OF A PRODUCT USING A PROCESS CONTROL PLAN DIGITAL TWIN

TECHNOLOGICAL FIELD

The present disclosure relates generally to manufacturing a product and, in particular, to developing a product using a digital twin of a control plan or other component of a manufacturing process for producing the product.

BACKGROUND

The development lifecycle for a number of products includes the design, development and verification of the product as well as the manufacturing process for producing the product. The phases of the development lifecycle are implemented in a number of different manners. Advanced product quality planning (APQP) refers to a structured framework for planning and completing actions of the development lifecycle to ensure the on-time delivery of quality products that satisfy cost-related targets. Some APQP standards describe the development lifecycle in phases including planning, product design and development, process design and development, product and process validation, and on-going production, use and post-delivery service.

The manufacturing process for a product may include a number of components such as a control plan that links the manufacturing process with quality assurance processes. The control plan inputs key product and process characteristics, design, process, machinery failure mode and effects analysis (D/P/M FMEA), and production process flow, and defines control activities and inspection, verification and validation methods to ensure quality in production. A control plan encompasses the systematic control measures of machinery and processes to ensure build per print. A control plan is traditionally described for human operators in a human-readable format as control element requirements and how those requirements should be met. This limits use of the control plan by automation; and accordingly, its value in the development lifecycle.

Therefore, it would be desirable to have a system and method that takes into account at least some of the issues discussed above, as well as other possible issues.

BRIEF SUMMARY

Example implementations of the present disclosure are generally directed to designing and manufacturing a product. Example implementations provide a digital system model (DSM) of authoritative data that describes the product and manufacturing process for producing the product, as well as a digital twin (DTw) of an instance of a component such as a control plan of the manufacturing process. The control plan may be used to digitally represent, analyze, determine, and optimize for quality assurance of product and process conformity to specifications and acceptance criteria, and its DTw may connect with real-world data collected from sensors during production operations including manufacturing, quality, and environmental.

Example implementations may use the collected real-world data to verify and validate product and process conformity element-by-element and in aggregate for all elements in the control plan. In this regard, the DTw of the control plan may be a digital surrogate to the physical production and quality assurance processes that provides automated quality acceptance with a digital trace. The DSM and DTw of the control plan may transform traditional text-based information into digital, model-based, and machine executable, which may be analyzed, simulated, and optimized using various methods and data. Verification and validation may be continuous during the manufacturing process, rather than at set stages of the manufacturing process; and when the verification and validation is continuous, disruptions and stop/resume cycles of inspections may be reduced. Example implementations may result in higher rate of first-time quality, higher rate of production, and higher equipment utilization.

The present disclosure thus includes, without limitation, the following example implementations.

Some example implementations provide a method of developing a product, the method comprising: generating a digital system model (DSM) of authoritative data that describes the product and a manufacturing process for producing the product, including machinery, materials, methods, facility and manpower used during the manufacturing process; generating a digital twin (DTw) of an instance of a component of the manufacturing process from the DSM, the DTw including a digital replica of the instance of the component of the manufacturing process including one or more of the machinery, materials, methods, facility or manpower used during the manufacturing process; receiving attribute data measured as the manufacturing process is performed to produce the product, the attribute data for attributes of process characteristics that are subject to sources of variation of one or more of the machinery, materials, methods, facility or manpower that cause variation in product characteristics; executing the digital replica with input of the attribute data, and thereby updating the DTw to replicate the instance of the component of the manufacturing process as performed; performing a data analysis of the manufacturing process based on the DTw as updated; and modifying the product or the manufacturing process based on the data analysis to reduce variability in one or more of the product characteristics.

In some example implementations of the method of any preceding example implementation, or any combination of any preceding example implementations, the component of the manufacturing process is a control plan that identifies the process characteristics, and that further identifies control methods for the sources of variation to which the process characteristics are subject, and verification and validation methods for the attributes of the process characteristics, and wherein generating the DTw of the instance of the component includes generating a DTw of an instance of the control plan, and modifying the manufacturing process includes modifying one or more of the control methods.

In some example implementations of the method of any preceding example implementation, or any combination of any preceding example implementations, the method further comprises establishing a digital thread from the DTw that links the authoritative data of the DSM, and the attribute data measured as the manufacturing process is performed.

In some example implementations of the method of any preceding example implementation, or any combination of any preceding example implementations, generating the DSM includes: accessing a metamodel of the component of the manufacturing process that specifies a logical schema for the component; and encoding the authoritative data for the component according to the logical schema.

In some example implementations of the method of any preceding example implementation, or any combination of any preceding example implementations, the component of the manufacturing process includes one or more of the machinery used during the manufacturing process, the one or more of the machinery expressed as computer models stored in a catalog, separate and distinct from the DSM and the DTw, and wherein generating the DSM includes generating the DSM that calls out the computer models, and generating the DTw includes generating instances of the computer models stored in the catalog.

In some example implementations of the method of any preceding example implementation, or any combination of any preceding example implementations, the component of the manufacturing process includes one or more of the methods used during the manufacturing process, the one or more of the methods expressed as algorithms stored in a catalog, separate and distinct from the DSM and the DTw, and wherein generating the DSM includes generating the DSM that calls out the methods, and generating the DTw includes generating instances of the algorithms stored in the catalog.

In some example implementations of the method of any preceding example implementation, or any combination of any preceding example implementations, the component of the manufacturing process includes one or more of the machinery and methods used during the manufacturing process, and generating the DTw includes: identifying the one or more of the machinery and methods from the DSM; and generating the DTw including instances of computer models and algorithms that express the one or more of the machinery and methods.

In some example implementations of the method of any preceding example implementation, or any combination of any preceding example implementations, generating the DTw further includes configuring the DTw in which the instances of the computer models and algorithms are connected with sources of the attribute data.

In some example implementations of the method of any preceding example implementation, or any combination of any preceding example implementations, executing the digital replica includes executing the computer models and algorithms, with input of the attribute data from the sources of the attribute data.

In some example implementations of the method of any preceding example implementation, or any combination of any preceding example implementations, generating the DTw includes generating digital twins (DTws) of multiple instances of the component of the manufacturing process, and wherein the attribute data is received from multiple runs of the manufacturing process for respective ones of the DTws, the digital replica is executed to update the DTws to replicate the multiple instances of the component as performed, and the data analysis is performed based on the DTws as updated.

In some example implementations of the method of any preceding example implementation, or any combination of any preceding example implementations, the data analysis is performed based on the DTws as updated from execution of the digital replica to replicate the multiple instances of the component, and wherein modifying the product or the manufacturing process includes modifying the authoritative data of the DSM based on the data analysis of the multiple instances of the component.

Some example implementations provide an apparatus for developing a product, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for developing a product, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to manufacturing a product. Example implementations may be applied to the development of any of a number of different products such as mechanical products, electrical products, electromechanical products, software products, chemical products, biological products and the like. More specific examples of suitable products include manned or unmanned vehicles (e.g., motor vehicles, railed vehicles, watercraft, aircraft, spacecraft, etc.), aircraft hangars, office buildings, bridges, or other types of product. A product is generally one that is produced according to (the result of) a manufacturing process.

Example implementations provide a digital system model (DSM) of authoritative data that describes the product and manufacturing process for producing the product, as well as a digital twin (DTw) of an instance of a component such as a control plan of the manufacturing process. The control plan may be used to digitally represent, analyze, determine, and optimize for quality assurance of product and process conformity to specifications and acceptance criteria, and its DTw may connect with real-world data collected from sensors during production operations including manufacturing, quality, and environmental. In some but not necessarily all examples, various terms used herein are defined in the context of advanced product quality planning (APQP) such as in the manner specified by SAE International Aerospace Series, Requirements for Advanced Product Quality Planning and Production Part Approval Process, SAE Standard AS 9145, Rev. November 2016.

Figure 1:
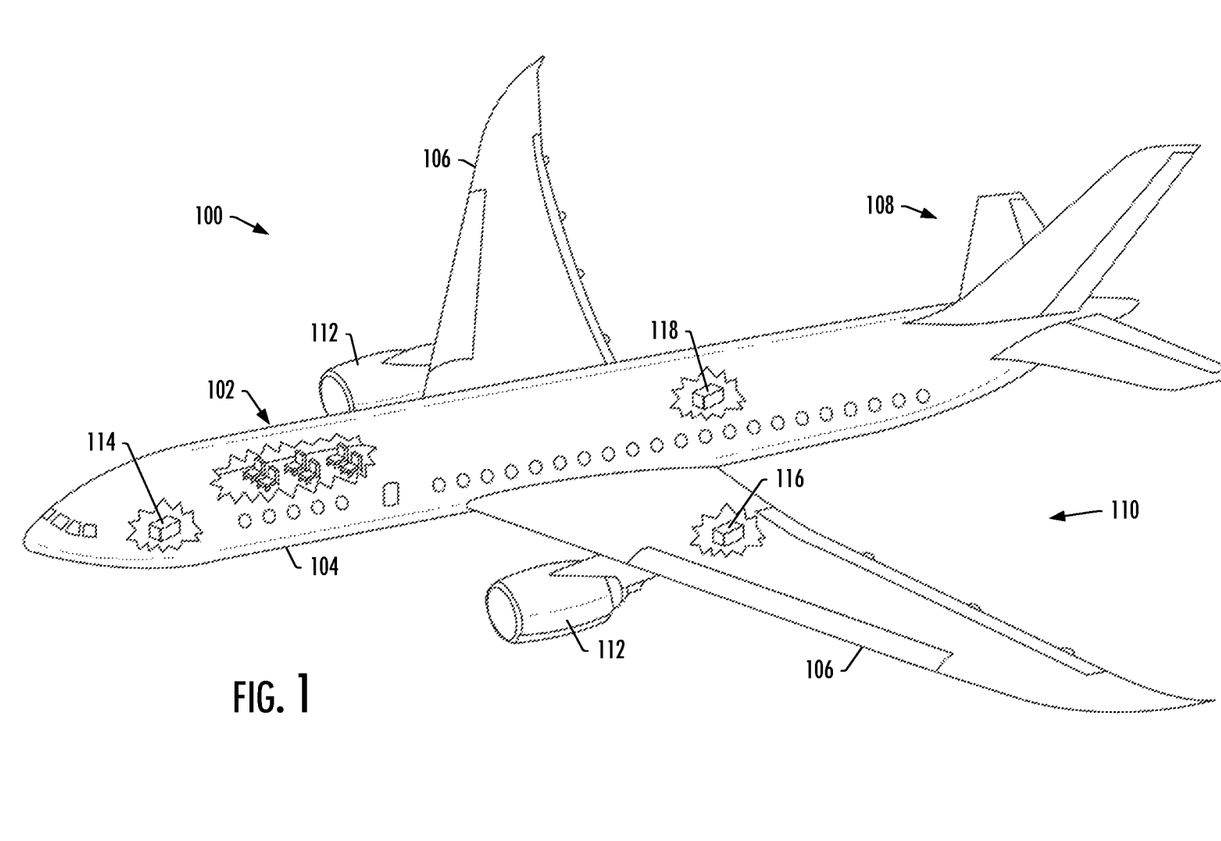
FIG. 1 illustrates an aircraft according to some example implementations of the present disclosure.

FIG. 1 illustrates an aircraft 100 representing one type of product or an assemblage of products that may be developed and manufactured according to example implementations of the present disclosure. As shown, the aircraft includes an airframe 102 with a fuselage 104, wings 106 and tail 108. The aircraft also includes a plurality of high-level systems 110 such as a propulsion system. In the particular example shown in FIG. 1, the propulsion system includes two wing-mounted engines 112. In other embodiments, the propulsion system can include other arrangements, for example, engines carried by other portions of the aircraft including the fuselage and/or the tail. The high-level systems may also include an electrical system 114, hydraulic system 116 and/or environmental system 118. Any number of other systems may be included.

Figure 2:
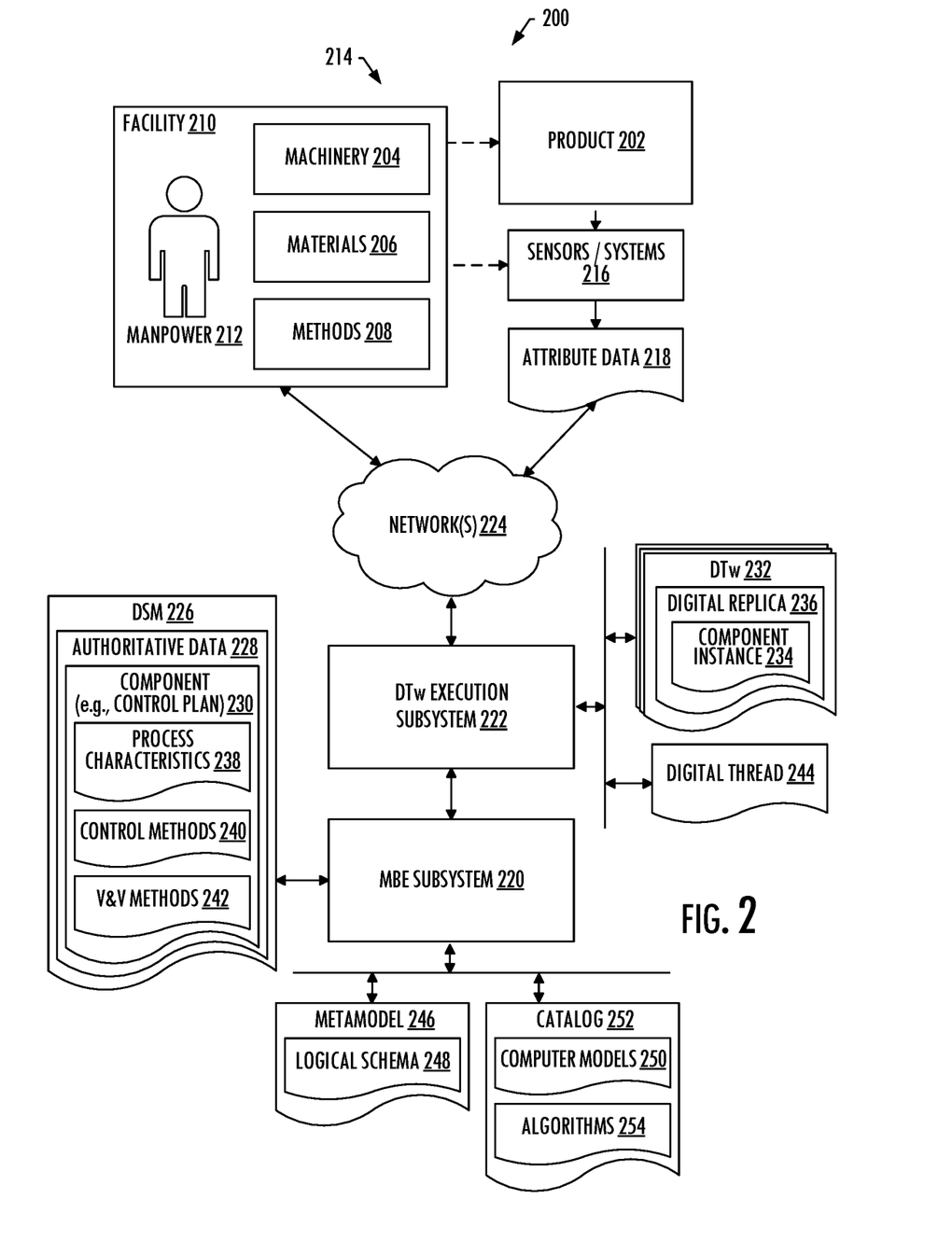
FIG. 2 illustrates a system for developing a product, according to some example implementations.

FIG. 2 illustrates a system 200 for developing a product 202 such as the aircraft 100 or component part of the aircraft, according to example implementations of the present disclosure. The system may include any of a number of different subsystems (each an individual system) for performing one or more functions or operations. In some examples, the system includes machinery 204, materials 206, methods 208, facility 210 and manpower 212 used during a manufacturing process 214 for producing the product. In some examples, the manufacturing process includes maintenance, service or the like of at least some of the machinery used during the manufacturing process. As also shown, the system includes one or more sensors or systems 216 configured to record or report data before, during and/or after manufacture of the product 202.

The sensors or systems 216 may include onboard sensors, or offboard/external sensors to one or more of the machinery 204, materials 206, facility 210 or manpower 212, and may include Internet of things (IoT) devices that are embedded with sensors to record or report data. The sensors and systems may include sensor concentrators, sensor aggregators and the like. More specific examples of sensors and systems include temperature sensors, humidity sensors, light sensors, distance/depth sensors, three-dimensional (3D) scanners, laser measurement sensors, image sensors such as cameras (e.g., digital camera, infrared camera, thermal camera, depth-aware or range camera, stereo camera), audio sensors (e.g., microphones), and the like. Additional examples of sensors and systems include position sensors (e.g., GPS, inertial navigation, Wi-Fi-based positioning, RFID-based positioning), motion sensors (e.g., accelerometers), orientation sensors (e.g., gyroscopes, compasses, magnetometers), inertial measurement units (IMUs), pressure sensors, clocks, calendars, light sensors, tilt sensors, landmark systems, dynamometers, telemetry sensors, fiber optic sensors and the like.

In some examples, the data recorded or reported by the sensors or systems 216 includes attribute data 218 measured as the manufacturing process 214 is performed to produce the product 202. The attribute data generally includes attributes of process characteristics that are subject to sources of variation (input variables) of one or more of the machinery, materials, methods, facility or manpower that cause variation in product characteristics (output variables).

A characteristic according to example implementations is a distinguishing feature, dimension or property of a process or its output (product 202) on which attribute data 218 may be collected. Product Characteristics are the features or properties of the product that are described by authoritative data for the product. Process characteristics include process variables (input variables) that have a cause and effect relationship with product characteristics. A process characteristic may be measured at the time it occurs, and its variation may be controlled to minimize product variation. There may be one or more process characteristics for one or more of the product characteristic. Similarly, a process characteristic may affect multiple product characteristic.

The system 200 of example implementations of the present disclosure also includes a model-based engineering (MBE) subsystem 220 and a digital twin (DTw) execution subsystem 222. In some examples, the MBE subsystem and the DTw execution subsystem are co-located or directly coupled to one another, and/or the machinery 204, facility 210 or sensors/systems 216. Additionally or alternatively, in some examples, the MBE subsystem and the DTw execution subsystem may communicate with one another and/or one or more of the machinery, facility or sensors/systems across one or more computer networks 224. Further, although shown as part of the system, it should be understood that any one or more of the above may function or operate as a separate system without regard to any of the other subsystems. It should also be understood that the system may include one or more additional or alternative subsystems than those shown in FIG. 2.

The MBE subsystem 220 is configured to generate a digital system model (DSM) 226 of authoritative data 228 that describes the product 202 and the manufacturing process 214 for producing the product, including machinery 204, materials 206, methods 208, facility 210 and manpower 212 used during the manufacturing process. The DSM is digital representation of the product that integrates authoritative data and associated artifacts that define the product and manufacturing process, and the DSM may be captured in a set of digitally-linked data sources and models. The authoritative data may include a number of components of the manufacturing process, such as key characteristics, design, process, manufacturing failure mode and effects analysis (D/P/M FMEA), production process flow, control plans and the like.

The DTw execution subsystem 222 is configured and enabled by DTw 232 of an instance 234 of a component 230 of the manufacturing process 214 from the DSM 226. The DTw includes a digital replica 236 of the instance of the component of the manufacturing process including one or more of the machinery 204, materials 206, methods 208, facility 210 or manpower 212 used during the manufacturing process. In some examples, the DTw execution subsystem is configured to generate the DTw from the DSM in a DTw execution environment through a sequence steps of transformations. The DTw may therefore provide a surrogate that may not only understand the behaviors and properties of the physical production systems through analytics and simulation, but also automated quality buyoffs based on the attribute data 218 from the sensors/systems 216.

The DTw execution subsystem 222 is configured to receive the attribute data 218 measured as the manufacturing process 214 is performed to produce the product 202, such as from the sensors/systems 216. The DTw execution subsystem is configured to execute the digital replica 236 with input of the attribute data, and thereby update the DTw 232 to replicate the instance 234 of the component of the manufacturing process as performed. The DTw execution subsystem is configured to perform a data analysis of the manufacturing process based on the DTw as updated, and modify the product or the manufacturing process based on the data analysis to reduce variability in one or more of the product characteristics.

One example of data analyses that may be performed, and modifications that may be made, in the case of a composite manufacturing process includes extracting a correlation of measurements of multiple manufacturing variables and quality metrics. These manufacturing variables may include environmental control data and machine attributes (e.g., tension, head speed), and the quality metrics may include classification of the product manufactured such as optimal, marginal, defected and the like. Suitable modifications may be encoded from the correlation to generate a machine control dataset to feed to an automation machine that performs the manufacturing process so that an optimal balance between these inputs may be optimized to improve quality.

In some examples, the component 230 of the manufacturing process 214 is a control plan that identifies the process characteristics 238. In some of these examples, the control plan further identifies control methods 240 for the sources of variation to which the process characteristics are subject, and verification and validation (V&V) methods 242 for the attributes of the process characteristics. Also in some of these examples, the DTw execution subsystem 222 is configured to generate the DTw 232 of an instance 234 of the control plan. The DTw execution subsystem, then, is configured to modify one or more of the control methods and thereby modify, improve or optimize the manufacturing process.

In some examples, the DTw execution subsystem 222 is further configured to establish a digital thread 244 from the DTw 232 that links the authoritative data 228 of the DSM 226, and the attribute data 218 measured as the manufacturing process 214 is performed. In the context of a product, a digital thread is known to describe a framework to connect data flows and produce a holistic view of the product's data across its lifecycle, and with traceability of the product's data. Example implementations may leverage model-based approaches that are more traceable, accurate, reusable and efficient.

The structure of a component 230 such as the control plan enables the systematic identification of measurement data requirements in context of the digital thread 244 across engineering, control, and execution. As design changes or methods evolve or are newly discovered, these data requirements may likewise evolve with the control plan as improvements. These data requirements may provide linkage and justification of the collection of attribute data 218, which is often a challenge (what data to collect for what objectives). This linkage in the digital thread may enables the connection of attribute data for the DTw 232 with the corresponding attribute data from the manufacturing process 214. Furthermore, it may enable the engineering design of the product/process to put results derived from the attribute data in context for issue identification, problem solving, and optimization of the manufacturing process.

In some examples, the MBE subsystem 220 configured to generate the DSM 226 includes the MBE subsystem configured to access a metamodel 246 of the component of the manufacturing process 214 that specifies a logical schema 248 for the component. The MBE subsystem, then, is configured to encode the authoritative data 228 for the component according to the logical schema, and thereby generate the DSM.

The design of components of the DSM 226 such as the control plan may provide the metamodel 246 as a representation of the control plan. The design may enable the systematic creation of any instance of the control plan element-by-element and using behavior models to aggregate and synthesize results from low-level V&V methods attribute-by-attribute to a high-level control plan that holistically looks at the entire manufacturing process 214. The design may establish a blueprint that is encoded in a modeling tool for creating model-based control plans that are consistent and based on the digital thread 244. The model-based control plans may be analyzed via formal techniques and simulation methods.

In some examples, the component 230 of the manufacturing process 214 includes one or more of the machinery 204 used during the manufacturing process, expressed as computer models 250 stored in a catalog 252, separate and distinct from the DSM 226 and the DTw 232. In some of these examples, the MBE subsystem 220 is configured to generate the DSM that calls out the computer models. Also in some of these examples, the DTw execution subsystem 222 configured to generate the DTw includes the DTw execution subsystem configured to generate instances of the computer models stored in the catalog.

In some examples, the component 230 of the manufacturing process 214 includes one or more of the V&V methods 242 used to analyze data generated during the manufacturing process, expressed as algorithms 254 stored in the catalog 252, separate and distinct from the DSM 226 and the DTw 232. In some of these examples, the MBE subsystem 220 is configured to generate the DSM that calls out the methods. And, the DTw execution subsystem 222 configured to generate the DTw includes the DTw execution subsystem configured to generate instances of the algorithms stored in the catalog, and have them ready to execute receiving data from the manufacturing process.

The catalog 252 in various example implementations may therefore store computer models 250 and algorithms 254 for the machinery 204 and V&V methods 242 used to analyze data generated during the manufacturing process 214. The separation of the computer models and algorithms from the core structure of the DSM 226 and DTw 232 may enable the development and validation of those computer models and algorithms with independent, specialized analytics tools based on control plan requirements for verification and validation at each process step, as well as combined behavior models for the manufacturing process. This may include mechanisms to model the behaviors and properties of the machinery and processes, which may be monitored and analyzed by the DTw for quality assurance. Examples of suitable mechanisms include establishing relationships between control elements (e.g., primary-secondary, alternate, and conditional) and combining element-level validation and verification results (e.g., AND, OR, group by criticality, etc.) for the manufacturing process. Furthermore, analytics, simulation, and optimization algorithms/routines may be callout out as methods in the DSM of the component 230 of the manufacturing process and incorporated in the DTw of the component (e.g., control plan).

Even further, the catalog 252 may enable the MBE subsystem 220 to generate the DSM 226 without native support for creating and operating the computer models 250 and algorithms 254. The catalog may be used to organize the computer models and algorithms in a manner that enables the MBE subsystem to select those appropriate for configuration of the DSM as the DSM is generated. Likewise, the DTw execution subsystem 222 may generate the DTw 232 by instantiating those computer models and methods configured in the DSM from the catalog.

In some examples, the component 230 of the manufacturing process 214 includes one or more of the machinery 204 and methods 208 used during the manufacturing process. In some of these examples, the DTw execution subsystem 222 configured to generate the DTw 232 includes the DTw execution subsystem configured to identify the one or more of the machinery and methods that are called out from the DSM 226. And, the DTw execution subsystem is configured to generate the DTw including instances of computer models 250 and algorithms 254 that express the one or more of the machinery and methods.

In some examples, the DTw execution subsystem 222 configured to generate the DTw 232 further includes the DTw execution subsystem designed to configure the DTw in which the instances of the computer models 250 and algorithms 254 are connected with sources of the attribute data 218. In some examples, the DTw execution subsystem 222 designed to execute the digital replica 236 includes the DTw execution subsystem designed to execute the computer models 250 and algorithms 254, with input of the attribute data 218 from the sources of the attribute data.

In some examples, the DTw execution subsystem 222 is designed to generate digital twins (DTws) 232 of multiple instances 234 of the component 230 of the manufacturing process 214. In some of these examples, the attribute data 218 is received by the DTw execution subsystem 222 from multiple runs of the manufacturing process for respective ones of the DTws. The digital replica 236 is executed by the DTw execution subsystem to update the DTws to replicate the multiple instances of the component as performed, and the data analysis is performed by the DTw execution subsystem based on the DTws as updated.

In some further examples, DTw execution subsystem 222 is designed to perform the data analysis based on the DTws as updated from execution of the digital replica to replicate the multiple instances of the component. In some of these examples, the DTw execution subsystem is configured to modify the authoritative data 228 of the DSM 226 based on the data analysis of the multiple instances of the component.

FIGS. 3A-3G are flowcharts illustrating various steps in a method 300 of developing a product 202, according to various example implementations of the present disclosure. The method includes generating a digital system model (DSM) 226 of authoritative data 228 that describes the product and a manufacturing process 214 for producing the product, including machinery 204, materials 206, methods 208, facility 210 and manpower 212 used during the manufacturing process, as shown at block 302. The method includes generating a digital twin (DTw) 232 of an instance 234 of a component 230 of the manufacturing process from the DSM 226, as shown at block 304. In some of these examples, the DTw includes a digital replica 236 of the instance of the component of the manufacturing process including one or more of the machinery, materials, methods, facility or manpower used during the manufacturing process.

Figure 3A:
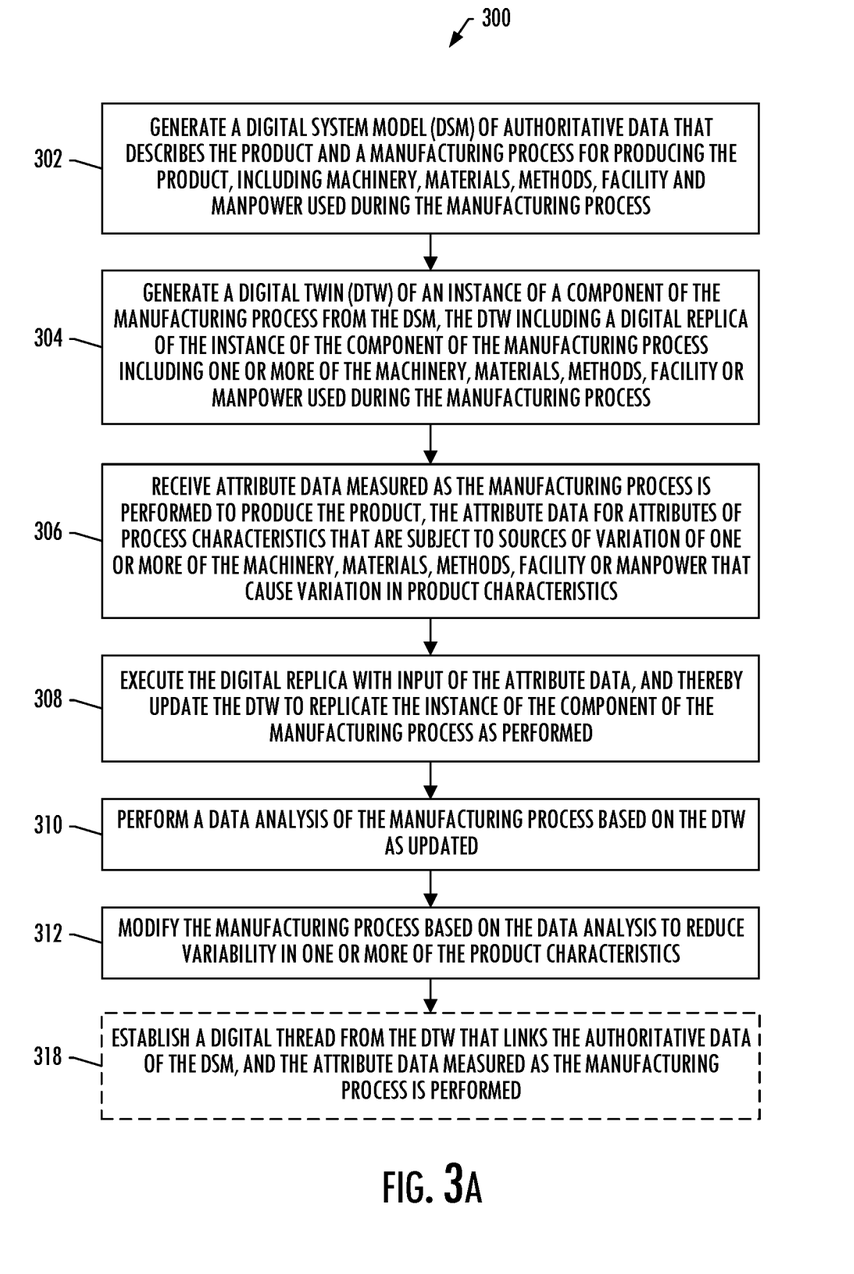
FIGS. 3A, 3B, 3C, 3D, 3E, 3F and 3G are flowcharts illustrating various steps in a method of developing a product, according to example implementations.

The method 300 includes receiving attribute data 218 measured as the manufacturing process 214 is performed to produce the product 202, as shown at block 306. The attribute data includes attributes of process characteristics that are subject to sources of variation of one or more of the machinery 204, materials 206, methods 208, facility 210 or manpower 212 that cause variation in product characteristics. The method includes executing the digital replica 236 with input of the attribute data, and thereby updating the DTw 232 to replicate the instance 234 of the component 230 of the manufacturing process as performed, as shown at block 308. The method includes performing a data analysis of the manufacturing process based on the DTw as updated, as shown at block 310. The method further includes modifying the product or the manufacturing process based on the data analysis to reduce variability in one or more of the product characteristics, as shown at block 312.

Figure 3B:
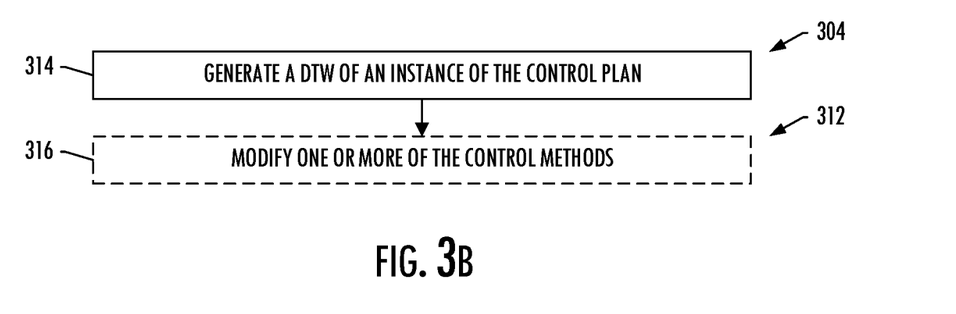

In some examples, the component 230 of the manufacturing process 214 is a control plan that identifies the process characteristics 238. In some of these examples, the control plan further identifies control methods 240 for the sources of variation to which the process characteristics are subject, and verification and validation methods 242 for the attributes of the process characteristics. Also in some of these examples, generating the DTw 232 of the instance 234 of the component at block 304 includes generating a DTw of an instance of the control plan, as shown at block 314. And, modifying the manufacturing process at block 312 includes modifying one or more of the control methods, as shown at block 316.

Figure 3C:
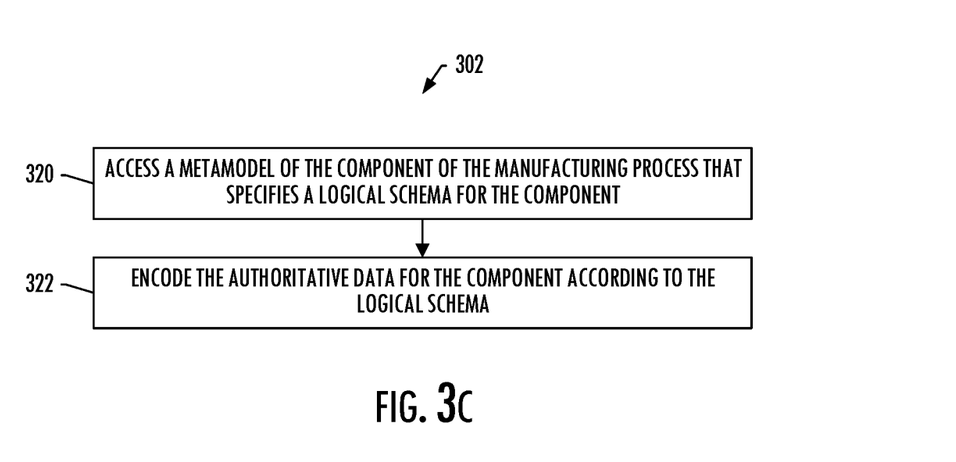

In some examples, the method 300 further includes establishing a digital thread 244 from the DTw 232 that links the authoritative data 228 of the DSM 226, and the attribute data 218 measured as the manufacturing process 214 is performed, as shown at block 318.

Figure 3D:
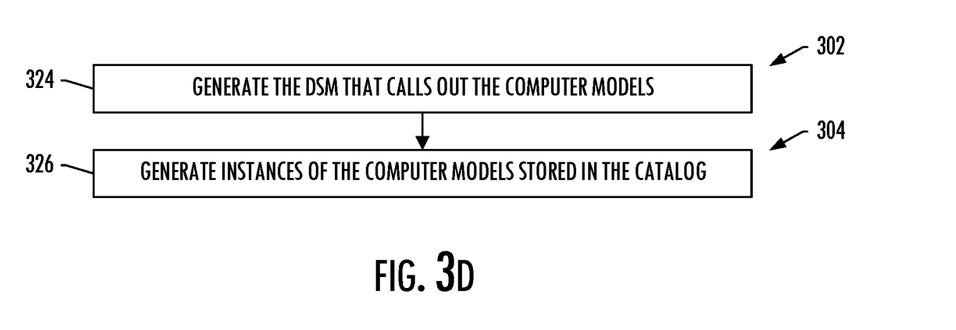

In some examples, generating the DSM 226 at block 302 includes accessing a metamodel 246 of the component 230 of the manufacturing process 214 that specifies a logical schema 248 for the component, as shown at block 320. The authoritative data 228 for the component, then, is encoded according to the logical schema, as shown at block 322.

Figure 3E:
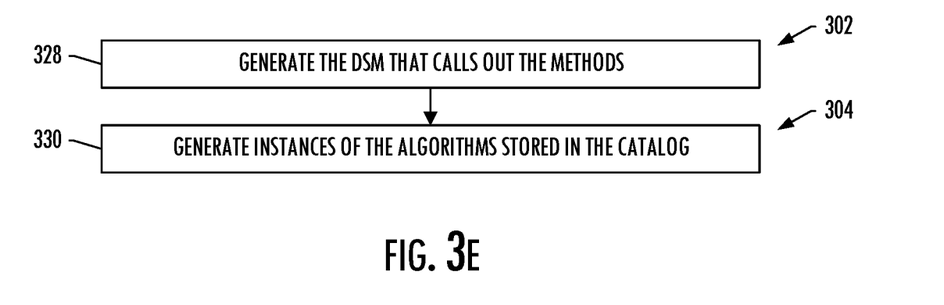

In some examples, the component 230 of the manufacturing process 214 includes one or more of the machinery 204 used during the manufacturing process, and the one or more of the machinery are expressed as computer models 250 stored in a catalog 252, separate and distinct from the DSM 226 and the DTw 232. In some of these examples, generating the DSM at block 302 includes generating the DSM that calls out the computer models, as shown at block 324. Also in some of these examples, generating the DTw at block 304 includes generating instances of the computer models stored in the catalog, as shown at block 326.

In some examples, the component 230 of the manufacturing process 214 includes one or more of the V&V methods 242 used to analyze data generated during the manufacturing process, and the one or more of the V&V methods are expressed as algorithms 254 stored in a catalog 252, separate and distinct from the DSM 226 and the DTw 232. In some of these examples, generating the DSM at block 302 includes generating the DSM that calls out the methods, as shown at block 328. And, generating the DTw at block 304 includes generating instances of the algorithms stored in the catalog, as shown at block 330.

Figure 3F:
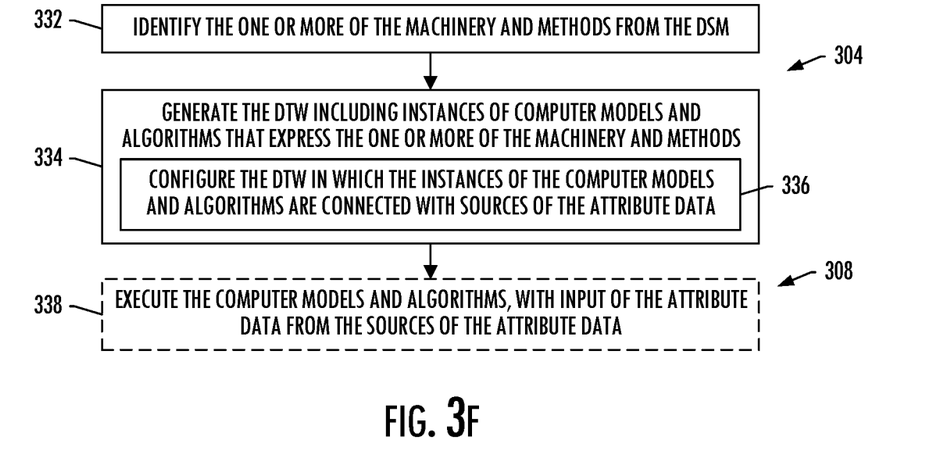

In some examples, the component 230 of the manufacturing process 214 includes one or more of the machinery 204 and methods 208 used during the manufacturing process. In some of these examples, generating the DTw 232 at block 304 includes identifying the one or more of the machinery and methods from the DSM 226, as shown at block 332. The DTw, then, is generated including instances of computer models 250 and algorithms 254 that express the one or more of the machinery and methods, as shown at block 334. In further some examples, generating the DTw at block 334 further includes configuring the DTw in which the instances of the computer models and algorithms are connected with sources of the attribute data 218, as shown at block 336.

In some examples, executing the digital replica 236 at block 308 includes executing the computer models 250 and algorithms 254, with input of the attribute data 218 from the sources of the attribute data, as shown at block 338.

Figure 3G:
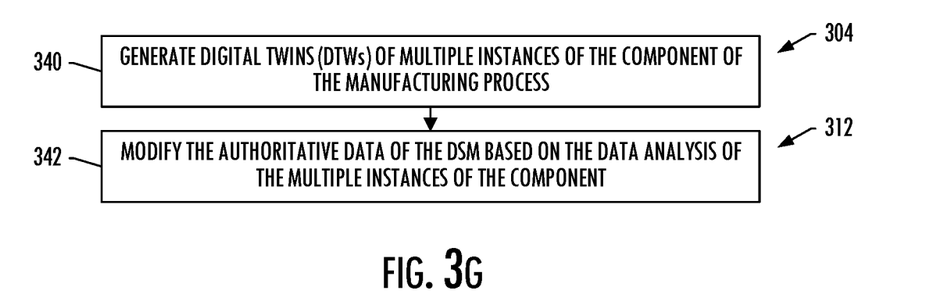

In some examples, generating the DTw 232 at block 304 includes generating digital twins (DTws) of multiple instances 234 of the component 230 of the manufacturing process 214, as shown at block 340 of FIG. 3G. In some of these examples, the attribute data 218 is received at block 306 from multiple runs of the manufacturing process for respective ones of the DTws, the digital replica 236 is executed at block 308 to update the DTws to replicate the multiple instances of the component as performed, and the data analysis is performed at block 310 based on the DTws as updated.

In some further examples, the data analysis is performed at block 310 based on the DTws as updated from execution of the digital replica 236 to replicate the multiple instances of the component. In some of these examples, modifying the product or the manufacturing process at block 312 includes modifying the authoritative data 228 of the DSM 226 based on the data analysis of the multiple instances of the component, as shown at block 342.

According to example implementations of the present disclosure, the system 200 and its subsystems including the MBE subsystem 220 and DTw execution subsystem 222 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 4:
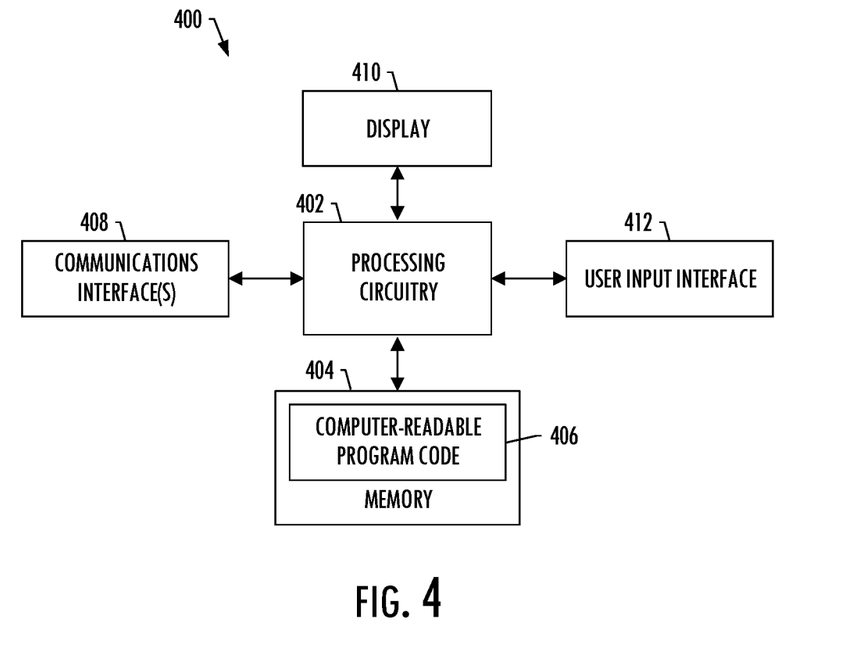
FIG. 4 illustrates an apparatus according to some example implementations.

FIG. 4 illustrates an apparatus 400 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 402 (e.g., processor unit) connected to a memory 404 (e.g., storage device).

The processing circuitry 402 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 404 (of the same or another apparatus).

The processing circuitry 402 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 404 is generally any piece of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 404, the processing circuitry 402 may also be connected to one or more interfaces for displaying, transmitting and/or receiving information. The interfaces may include a communications interface 408 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 410 and/or one or more user input interfaces 412 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 400 may include a processing circuitry 402 and a computer-readable storage medium or memory 404 coupled to the processing circuitry, where the processing circuitry is configured to execute computer-readable program code 406 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus for developing a product, the apparatus comprising:
   a memory configured to store computer-readable program code; and
   processing circuitry configured to access the memory, and execute the computer-readable program code to cause the apparatus to at least:
   generate a digital system model (DSM) of authoritative data that describes the product and a manufacturing process for producing the product, including machinery, materials, methods, facility and manpower used during the manufacturing process;

generate digital twins (DTws) of a plurality of respective instances of a component of the manufacturing process from the DSM, the DTws including digital replicas of the instances of the component of the manufacturing process including one or more of the machinery, materials, methods, facility or manpower used during the manufacturing process, wherein the component of the manufacturing process includes a control plan that identifies process characteristics and control methods for sources of variation to which the process characteristics are subject;

receive attribute data measured as multiple runs of the manufacturing process are performed to produce multiples of the product, the attribute data for attributes of the process characteristics identified by the control plan that are subject to the sources of variation of one or more of the machinery, materials, methods, facility or manpower that cause variation in product characteristics;

execute the digital replicas with input of the attribute data, and thereby update the DTws to replicate the respective instances of the component of the manufacturing process as performed, wherein updating the DTws comprises updating the plurality of respective instances of the control plan using the attribute data for the attributes of the process characteristics identified by the control plan;

perform a data analysis of the manufacturing process based on the DTws as updated by at least extracting a correlation of measurements of a plurality of manufacturing variables and quality metrics, wherein the manufacturing variables comprise environmental control data and machine attributes, and wherein the quality metrics comprise quality classifications of manufactured products; and modify the product or the manufacturing process based on the data analysis to reduce variability in one or more of the product characteristics by at least encoding the correlation to generate a machine control dataset and feeding the machine control dataset to a machine that performs the manufacturing process.

2. The apparatus of claim 1, wherein the control plan further identifies verification and validation methods for the attributes of the process characteristics, and wherein the apparatus caused to generate the DTws of the plurality of respective instances of the component includes the apparatus caused to generate a DTw of an instance of the control plan, and the apparatus caused to modify the manufacturing process includes the apparatus caused to modify one or more of the control methods.

3. The apparatus of claim 1 further, wherein the apparatus is caused to establish a digital thread from the DTws that links the authoritative data of the DSM, and the attribute data measured as the manufacturing process is performed.

4. The apparatus of claim 1, wherein the apparatus caused to generate the DSM includes the apparatus caused to:
access a metamodel of the component of the manufacturing process that specifies a logical schema for the component; and
encode the authoritative data for the component according to the logical schema.

5. The apparatus of claim 1, wherein the component of the manufacturing process further includes one or more of the machinery used during the manufacturing process, the one or more of the machinery expressed as computer models stored in a catalog, separate and distinct from the DSM and the DTws, and wherein the apparatus caused to generate the DSM includes the apparatus caused to generate the DSM that calls out the computer models, and the apparatus caused to generate the DTws includes the apparatus caused to generate instances of the computer models stored in the catalog.

6. The apparatus of claim 1, wherein the component of the manufacturing process further includes one or more of the methods used during the manufacturing process, the one or more of the methods expressed as algorithms stored in a catalog, separate and distinct from the DSM and the DTws, and wherein the apparatus caused to generate the DSM includes the apparatus caused to generate the DSM that calls out the methods, and the apparatus caused to generate the DTws includes the apparatus caused to generate instances of the algorithms stored in the catalog.

7. The apparatus of claim 1, wherein the component of the manufacturing process further includes one or more of the machinery and methods used during the manufacturing process, and the apparatus caused to generate the DTws includes the apparatus caused to:
identify the one or more of the machinery and methods from the DSM; and
generate the DTws including instances of computer models and algorithms that express the one or more of the machinery and methods.

8. The apparatus of claim 7, wherein the apparatus caused to generate the DTws further includes the apparatus caused to configure the DTws in which the instances of the computer models and algorithms are connected with sources of the attribute data.

9. The apparatus of claim 8, wherein the apparatus caused to execute the digital replicas includes the apparatus caused to execute the computer models and algorithms, with input of the attribute data from the sources of the attribute data.

10. The apparatus of claim 1, wherein performing the data analysis of the manufacturing process includes extracting a correlation of measurements of multiple manufacturing variables and quality metrics.

11. The apparatus of claim 1, wherein the data analysis is performed based on the DTws as updated from execution of the digital replicas to replicate the multiple instances of the component, and wherein the apparatus caused to modify the product or the manufacturing process includes the apparatus caused to modify the authoritative data of the DSM based on the data analysis of the multiple instances of the component.

12. A method of developing a product, the method comprising:
generating a digital system model (DSM) of authoritative data that describes the product and a manufacturing process for producing the product, including machinery, materials, methods, facility and manpower used during the manufacturing process;
generating digital twins (DTws) of a plurality of respective instances of a component of the manufacturing process from the DSM, the DTws including digital replicas of the instances of the component of the manufacturing process including one or more of the machinery, materials, methods, facility or manpower used during the manufacturing process, wherein the component of the manufacturing process includes a control plan that identifies process characteristics and control methods for sources of variation to which the process characteristics are subject;

receiving attribute data measured as multiple runs of the manufacturing process are performed to produce multiples of the product, the attribute data for attributes of the process characteristics identified by the control plan that are subject to the sources of variation of one or more of the machinery, materials, methods, facility or manpower that cause variation in product characteristics;

executing the digital replicas with input of the attribute data, and thereby updating the DTws to replicate the respective instances of the component of the manufacturing process as performed;

performing a data analysis of the manufacturing process based on the DTws as updated by at least extracting a correlation of measurements of a plurality of manufacturing variables and quality metrics, wherein the manufacturing variables comprise environmental control data and machine attributes, and wherein the quality metrics comprise quality classifications of manufactured products; and modifying the product or the manufacturing process based on the data analysis to reduce variability in one or more of the product characteristics by at least encoding the correlation to generate a machine control dataset and feeding the machine control dataset to a machine that performs the manufacturing process.

13. The method of claim 12, wherein the control plan further identifies verification and validation methods for the attributes of the process characteristics, and wherein generating the DTws of the respective instances of the component includes generating a DTw of an instance of the control plan, and modifying the manufacturing process includes modifying one or more of the control methods.

14. The method of claim 12 further comprising establishing a digital thread from the DTws that links the authoritative data of the DSM, and the attribute data measured as the manufacturing process is performed.

15. The method of claim 12, wherein generating the DSM includes:

accessing a metamodel of the component of the manufacturing process that specifies a logical schema for the component; and encoding the authoritative data for the component according to the logical schema.

16. The method of claim 12, wherein the component of the manufacturing process further includes one or more of the machinery used during the manufacturing process, the one or more of the machinery expressed as computer models stored in a catalog, separate and distinct from the DSM and the DTws, and wherein generating the DSM includes generating the DSM that calls out the computer models, and generating the DTws includes generating instances of the computer models stored in the catalog.

17. The method of claim 12, wherein the component of the manufacturing process further includes one or more of the methods used during the manufacturing process, the one or more of the methods expressed as algorithms stored in a catalog, separate and distinct from the DSM and the DTws, and wherein generating the DSM includes generating the DSM that calls out the methods, and generating the DTws includes generating instances of the algorithms stored in the catalog.

18. The method of claim 12, wherein the component of the manufacturing process further includes one or more of the machinery and methods used during the manufacturing process, and generating the DTws includes:

identifying the one or more of the machinery and methods from the DSM; and generating the DTws including instances of computer models and algorithms that express the one or more of the machinery and methods.

19. The method of claim 18, wherein generating the DTws further includes configuring the DTws in which the instances of the computer models and algorithms are connected with sources of the attribute data.

20. The method of claim 19, wherein executing the digital replicas includes executing the computer models and algorithms, with input of the attribute data from the sources of the attribute data.

21. The method of claim 12, wherein performing the data analysis of the manufacturing process includes extracting a correlation of measurements of multiple manufacturing variables and quality metrics.

22. The method of claim 12, wherein the data analysis is performed based on the DTws as updated from execution of the digital replicas to replicate the multiple instances of the component, and wherein modifying the product or the manufacturing process includes modifying the authoritative data of the DSM based on the data analysis of the multiple instances of the component.

\* \* \* \* \*